US009846093B2

(12) United States Patent
Smith et al.

(10) Patent No.: US 9,846,093 B2
(45) Date of Patent: Dec. 19, 2017

(54) ANALYZING A COLLISION WITH A VEHICLE HAVING UNKNOWN DAMAGE

(71) Applicant: CCC Information Services Inc., Chicago, IL (US)

(72) Inventors: Darrin A. Smith, San Antonio, TX (US); Kenna Henn, Austin, TX (US)

(73) Assignee: CCC Information Services Inc., Chicago, IL (US)

(*) Notice: Subject to any disclaimer, the term of this patent is extended or adjusted under 35 U.S.C. 154(b) by 413 days.

(21) Appl. No.: 14/580,537

(22) Filed: Dec. 23, 2014

(65) Prior Publication Data

US 2016/0178465 A1   Jun. 23, 2016

(51) Int. Cl.
G01L 5/00 (2006.01)
G09B 23/00 (2006.01)
G06F 17/50 (2006.01)

(52) U.S. Cl.
CPC ............ *G01L 5/0052* (2013.01); *G06F 17/50* (2013.01); *G09B 23/00* (2013.01)

(58) Field of Classification Search
None
See application file for complete search history.

(56) References Cited

U.S. PATENT DOCUMENTS

| | | | |
|---|---|---|---|
| 6,381,561 B1 | 4/2002 | Bomar et al. | |
| 6,470,303 B2 | 10/2002 | Kidd et al. | |
| 7,359,821 B1* | 4/2008 | Smith | G01L 5/0052 702/113 |
| 7,502,772 B2 | 3/2009 | Kidd et al. | |
| 7,698,086 B2 | 4/2010 | Kidd et al. | |
| 7,716,002 B1 | 5/2010 | Smith et al. | |
| 7,974,808 B2* | 7/2011 | Smith | G01L 5/0052 702/113 |
| 8,239,220 B2 | 8/2012 | Kidd et al. | |
| 8,731,977 B1 | 5/2014 | Hardin et al. | |
| 2002/0099527 A1* | 7/2002 | Bomar, Jr. | G06Q 99/00 703/8 |
| 2008/0147266 A1 | 6/2008 | Plante et al. | |

(Continued)

OTHER PUBLICATIONS

Nathan A. Rose, Integrating Monte Carlo Simulation, Momentum-Based Impact Modeling, and Restitution Data to Analyze Crash Severity, Copyright 2001 SAE International and Messe Duüsseldorf, 17 pages.*

(Continued)

*Primary Examiner* — Tung Lau
(74) *Attorney, Agent, or Firm* — Trop, Pruner & Hu, P.C.

(57) ABSTRACT

In an example, a system includes a Monte Carlo simulation module to calculate a collision force on a first vehicle based at least in part on first information, calculate a crush depth for a second vehicle (having unknown damage) based at least in part on the calculated collision force on the first vehicle and second information, calculate first total energy absorbed by the first vehicle based on the first information, calculate second total energy absorbed by the second vehicle based on the calculated crush depth and the second information; and calculate a first estimated impact severity for the first vehicle using the first total energy and a second estimated impact severity for the second vehicle using the second total energy.

20 Claims, 9 Drawing Sheets

(56) References Cited

U.S. PATENT DOCUMENTS

2010/0228432 A1* 9/2010 Smith ................... G01L 5/0052
702/113
2012/0265698 A1 10/2012 Kidd et al.

OTHER PUBLICATIONS

Mark S. Erickson, et al., "Damage-Based Collision Severity Reconstruction Technique (For use when crush measurement are only available for one vehicle)," 2007, 3 pages.
International Searching Authority, "Notification of Transmittal of the International Search Report and the Written Opinion of the International Searching Authority," dated Apr. 8, 2016, in International application No. PCT/US2015/066258.

* cited by examiner

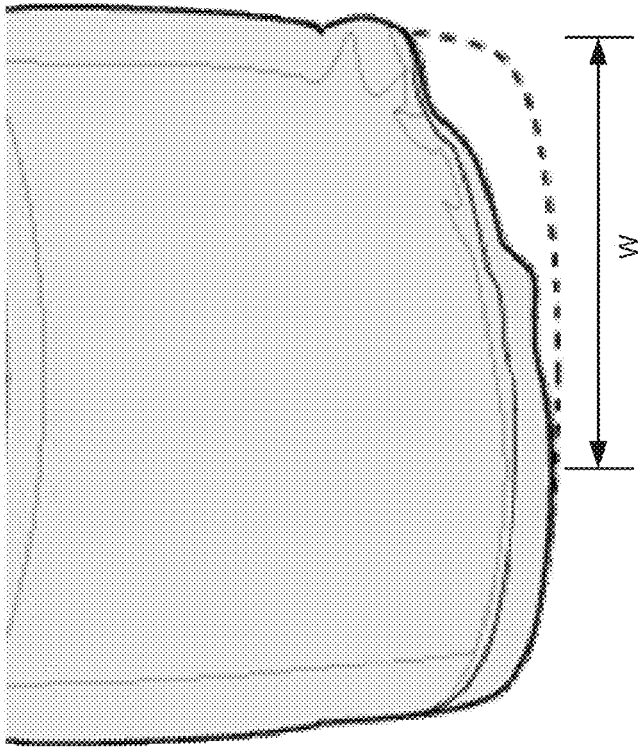
FIG. 2

ANALYZING A COLLISION WITH A VEHICLE HAVING UNKNOWN DAMAGE

BACKGROUND

Vehicular accidents are a common occurrence in many parts of the world and, unfortunately, vehicular accidents, even at low impact and separation velocities, are often accompanied by injury to vehicle occupants. It is often desirable to reconcile actual occupant injury reports to a potential for energy based on vehicular accident information. Trained engineers and accident reconstruction experts evaluate subject vehicles involved in a collision, and based on their training and experience, may be able to arrive at an estimated change in velocity for each the subject vehicles. The potential for injury can be derived from knowledge of the respective change in velocity for the subject vehicles.

However, involving trained engineers and accident reconstruction experts in all collisions, especially in the numerous low velocity collisions, is often not cost effective. Other techniques also have concerns. For example, energy-based methods commonly employed to assess collision severity require an estimate of the deformation to both vehicles involved in the collision. For some insurance carriers, it is not part of their standard claims process to collect post-accident photographs for a third party vehicle. For these carriers, the information about the physical damage to the third party vehicle may be limited to what can be inferred from a police report or a repair estimate, which can prevent use of certain techniques.

SUMMARY OF THE INVENTION

In one aspect, a method comprises: receiving, in an impact severity determination logic of a computer system, first information for a first vehicle involved in a collision and second information for a second vehicle involved in the collision, where crush depth information is not available for the second vehicle; initializing, in the impact severity determination logic, a Monte Carlo simulation; calculating, in the impact severity determination logic, for each of a plurality of iterations of the Monte Carlo simulation, a collision force on the first vehicle based at least in part on the first information; calculating, in the impact severity determination logic, for each of the plurality of iterations of the Monte Carlo simulation, a crush depth for the second vehicle based at least in part on the calculated collision force on the first vehicle and the second information; calculating, in the impact severity determination logic, for each of the plurality of iterations of the Monte Carlo simulation, first total energy absorbed by the first vehicle based on the first information including first crush depth information for the first vehicle, and calculating second total energy absorbed by the second vehicle based on the calculated crush depth and the second information; calculating, in the impact severity determination logic, for each of the plurality of iterations of the Monte Carlo simulation, a first impact severity for the first vehicle using the first total energy, and calculating a second impact severity for the second vehicle using the second total energy; and reporting a range of the first impact severity for the first vehicle and a range of the second impact severity for the second vehicle based on the Monte Carlo simulation, via an output device of the computer system.

In another aspect, a system comprises: an input processing logic to receive first information regarding a first vehicle involved in a collision and to receive second information regarding a second vehicle involved in the collision, the second information not including crush depth information for the second vehicle; a Monte Carlo simulation module, a report generation logic to generate a report including the first estimated impact severity for the first vehicle and the second estimated impact severity for the second vehicle, for each of a plurality of iterations of a Monte Carlo simulation; and a report output logic coupled to the report generation logic to output the report to an end user.

In an example, the Monte Carlo simulation module has one or more constituent logics, including a collision force determination logic to calculate a collision force on the first vehicle based at least in part on the first information; a crush depth calculation logic to calculate a crush depth for the second vehicle based at least in part on the calculated collision force on the first vehicle and the second information; an energy absorption calculation logic to calculate first total energy absorbed by the first vehicle based on the first information (including first crush depth information for the first vehicle), and to calculate second total energy absorbed by the second vehicle based on the calculated crush depth and the second information; and an impact severity calculation logic to calculate a first estimated impact severity for the first vehicle using the first total energy and a second estimated impact severity for the second vehicle using the second total energy.

In yet another aspect, a non-transitory computer readable medium comprises instructions that when executed enable a computer system to perform a method comprising: receiving first information for a first vehicle involved in a collision and second information for a second vehicle involved in the collision, where crush depth information is not available for the second vehicle; initializing a Monte Carlo simulation; calculating, for each of a plurality of iterations of the Monte Carlo simulation, a collision force on the first vehicle based at least in part on the first information; calculating, for each of the plurality of iterations of the Monte Carlo simulation, a crush depth for the second vehicle based at least in part on the calculated collision force on the first vehicle and the second information; calculating, for each of the plurality of iterations of the Monte Carlo simulation, first total energy absorbed by the first vehicle based on the first information including first crush information for the first vehicle, and calculating second total energy absorbed by the second vehicle based on the calculated crush depth and the second information; calculating, for each of the plurality of iterations of the Monte Carlo simulation, a first impact severity for the first vehicle using the first total energy, and calculating a second impact severity for the second vehicle using the second total energy; and reporting a range of the first impact severity for the first vehicle and a range of the second impact severity for the second vehicle based on the Monte Carlo simulation, via an output device of the computer system.

BRIEF DESCRIPTION OF THE DRAWINGS

FIG. 2 is an illustration of crush profile zones in accordance with an embodiment of the present invention.

DETAILED DESCRIPTION

In various embodiments, a system is configured to perform a biomechanical analysis of a vehicle collision when physical damage to one of the vehicles cannot be objectively estimated from post-accident information, such as photographs, report information or so forth. As described herein, an Unknown Damage Analytics (UDA) technique may be used to accurately and readily determine various factors regarding an accident and vehicle for which information is not known (an unknown damage vehicle).

An UDA algorithm as described herein leverages Newton's third law of motion, which states that: for every action, there is an equal and opposite reaction. In a two-vehicle collision, this means that the collision force acting on the second vehicle is equal in magnitude and opposite in direction to the collision force acting on the first vehicle:

$$\vec{F}_2 = -\vec{F}_1, |\vec{F}_2| = |\vec{F}_1| = F \quad \text{Equation 1}$$

Figure 1:
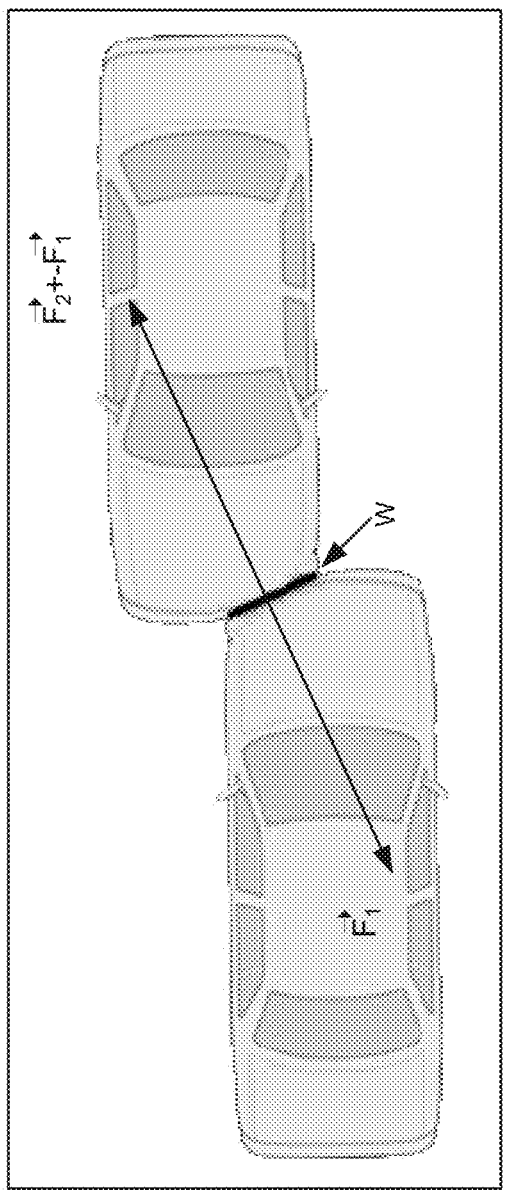
FIG. 1 is an illustration of a vehicle involved in a collision.

FIG. 1 illustrates application of Newton's third law to a two vehicle collision in which a force $\vec{F}_2$ acting on a second vehicle is equal and opposite to a force $\vec{F}_1$ acting on a first vehicle.

Embodiments may calculate a collision force on a first vehicle (for which at least certain information is known) using the vehicle's structural characteristics (stiffness), and a good estimate of deformation (referred to herein also as crush). In an embodiment, this deformation estimate may be obtained from post-accident photographs, and in a particular embodiment may leverage photogrammetric and other techniques such as disclosed in U.S. Pat. Nos. 6,381,561 and 8,239,220, the disclosures of which are hereby incorporated by reference.

The UDA algorithm uses a linear stiffness model in which force per unit width is proportional to crush depth:

$$\frac{F}{W} = A + BC \quad \text{Equation 2}$$

In Equation 2, C is crush depth, A and B are vehicle stiffness coefficients derived from staged crash tests, and W is the width of the crush area. The total force magnitude is calculated by integrating this function over the crush area:

$$F = \int_0^W \frac{F(W)}{W} dw = \int_0^W [A + BC(w)] dw \quad \text{Equation 3}$$

If the crush is constant over the crush area, it can be shown that:

$$F = W(A+BC) \quad \text{Equation 4}$$

In an embodiment, the crush area can be approximated by dividing it into a series of equal-width crush zones, each having a uniform crush depth, as shown in FIG. 2. As seen in FIG. 2, a crush width of W can be divided into a set of crush zones C1-C5.

Using this approximation for crush profiles, the integration of Equation 3 becomes:

$$F = \sum_{i=1}^{N} \frac{W}{N}(A + BC_i) = W(A + BC_{avg}) \quad \text{Equation 5}$$

where $C_{avg}$ is the average crush depth for a series of N crush zones.

In an embodiment, the energy required to produce a crush profile is calculated by doubly integrating the force over both the crush depth and crush width:

$$E = \iint (A+BC) dC dW \quad \text{Equation 6}$$

$$E = \int (AC + \tfrac{1}{2}BC^2 + G) dW \quad \text{Equation 7}$$

Here, G, the threshold force, is the maximum amount of force that can be applied to the vehicle without causing any permanent deformation. G is given by:

$$G = \frac{A^2}{2B} \quad \text{Equation 8}$$

For a uniform (constant) crush profile, it can be shown that:

$$E = W\left(G + AC + \frac{1}{2}BC^2\right) \quad \text{Equation 9}$$

Therefore, for a crush profile approximated by equal-width crush zones, each with a uniform crush depth, the total energy is the sum of the individual zone energies:

$$E = \sum_{i=1}^{N} \frac{W}{N}\left(G + AC_i + \frac{1}{2}BC_i^2\right) \quad \text{Equation 10}$$

Equation 10 reduces to:

$$E = GW + (A + BC_{cg})\text{Area} \quad \text{Equation 11}$$

where Area is the area of the crush profile given by:

$$\text{Area} = \sum_{i=1}^{N} C_i \frac{W}{N} = WC_{avg} \quad \text{Equation 12}$$

and $C_{cg}$ is the centroid of the crush profile, given by:

$$C_{cg} = \frac{1}{2N} \frac{\Sigma C_i^2}{C_{avg}} \quad \text{Equation 13}$$

In an embodiment, it is assumed that both vehicles' crush profiles have the same width (W, as shown in FIG. 1).

In one embodiment, the basic operation of the UDA algorithm is as follows:
1. Using the crush profile and stiffness coefficients for the known vehicle, the collision force for this vehicle is calculated using Equation 5, above.
2. Assuming a uniform crush profile for the unknown damage vehicle, the uniform crush depth required to produce the same force as in step 1 is calculated. In an embodiment, this determination may be done by using Equation 4 and solving for crush (per Equation 14).

$$C_2 = \frac{\frac{F_1}{W_1} - A_2}{B_2} \qquad \text{Equation 14}$$

3. The damage energy for the known damage vehicle is calculated (using Equation 11).
4. The damage energy for the unknown damage vehicle is calculated (using Equation 9).
5. Impact severity (e.g., in terms of change in velocity ($\Delta V$)) may be calculated for both vehicles using Equations 15 and 16.

$$\Delta V_1 = \frac{1}{M_1} \sqrt{\frac{2M_1 M_2 (E_1 + E_2)}{M_1 + M_2}} \qquad \text{Equation 15}$$

$$\Delta V_2 = \frac{1}{M_2} \sqrt{\frac{2M_1 M_2 (E_1 + E_2)}{M_1 + M_2}} \qquad \text{Equation 16}$$

In Equations 15 and 16, ($M_1$, $M_2$) are the masses of each vehicle and ($E_1$, $E_2$) are the damage energies of each vehicle. Note that in the above outline, subscript 1 represents the known damage vehicle and subscript 2 represents the vehicle with unknown damage.

Figure 3:
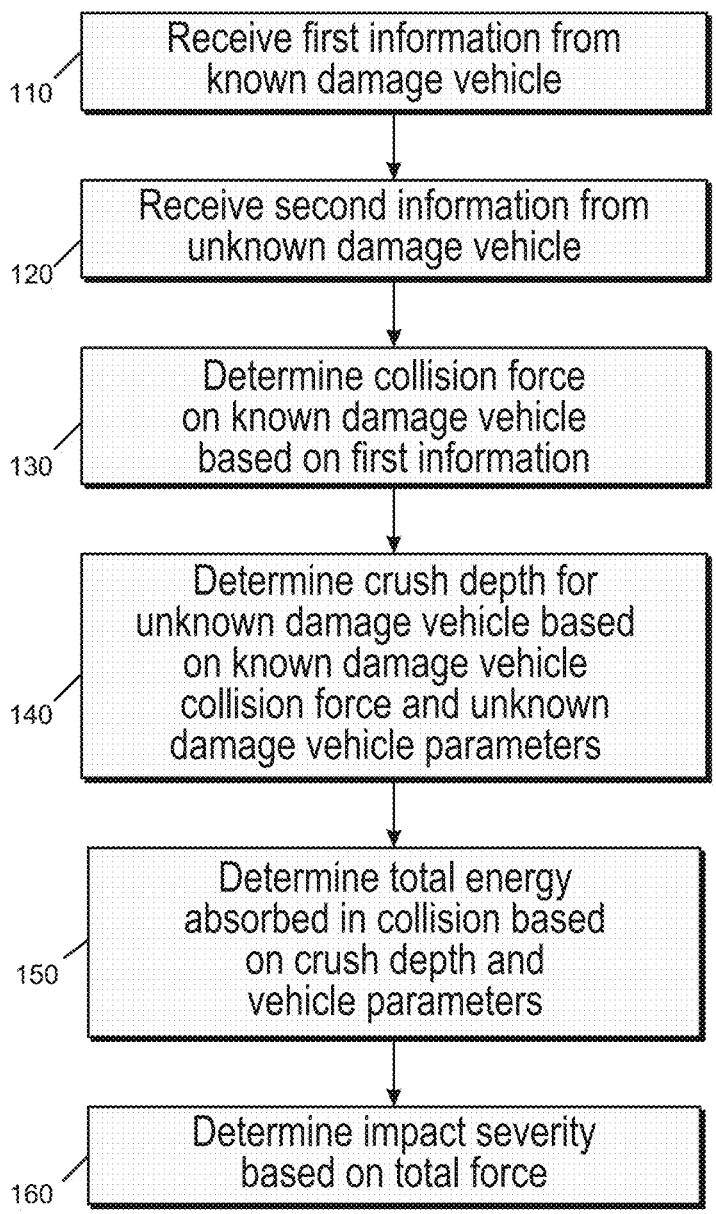
FIG. 3 is a flow diagram of a method for determining an impact severity for a vehicle involved in an accident, in accordance with an embodiment.

Referring now to FIG. 3, shown is a flow diagram of a method for determining an impact severity for a vehicle involved in an accident, in accordance with an embodiment. More specifically, method 100 of FIG. 3 may be performed by a combination of hardware, software and/or firmware, such as an impact severity determination logic of a computer system. Of course in other embodiments, method 100 can be implemented by other types of hardware logic, including both specialized and/or general-purpose hardware logic programmed to perform the method.

As seen, method 100 begins by receiving first information from a known damage vehicle (block 110). Such information may include, in an embodiment, vehicle identification information, primary point of impact information, pre-impact motion and collision deformation information. In addition, second information may be received regarding the unknown damage vehicle (block 120). This information may include, at a minimum, vehicle identification information, primary point of impact, pre-impact motion, and approximate area of damage information.

From this information, control passes to block 130 where a collision force may be determined on the known damage vehicle. Details regarding this determination are described above. Next, control passes to block 140 where a crush depth may be determined for the unknown damage vehicle. More specifically, this crush depth determination may be based on the known damage vehicle collision force and unknown damage vehicle parameters. Thereafter, control passes to block 150 where a total energy absorbed in the collision on each of the vehicles may be determined. In an embodiment, this determination may be based on crush depth (for both vehicles) and the corresponding vehicle parameters. From this total energy absorbed information, control passes thereafter to block 160 where an impact severity for each of the vehicles may be determined based on the total force. Note that this collision severity may further be used for additional accident analysis determinations, such as performing a biomechanical analysis with regard to occupants of one or more of the vehicles. Understand while shown at this high level in the embodiment of FIG. 3, many variations and alternatives are possible.

Thus using collision severity as determined as described herein, additional accident analysis determinations may be performed, such as performing an injury causation analysis with regard to occupants of one or more of the vehicles. Injury causation analysis is the application of medical and physical science in order to assess how injuries are caused in accidents. In some cases, the assessment may determine whether a given medical condition was or was not caused in an accident. In the context of vehicular accidents, the process typically involves a combination of evaluations performed in the scientific disciplines of vehicle dynamics, occupant kinematics, biomechanics and medical analysis. Injury causation analysis is possible because both the vehicle and the occupant respond predictably to forces and stresses in accordance with the basic physical principles contained in the laws of motion described by Newton. Once the occupant kinematics and the range of magnitude and direction of the biomechanical stresses in a specific accident are understood, injury potential can then be assessed using analytical and descriptive techniques of clinical medical science in conjunction with available information about the range of human tolerance to physical forces. The range of human tolerance to biomechanical stresses is informed by experimental impacts involving human volunteer subjects, field accident studies and published human impact tolerance criteria. Embodiments may thus use the vehicle collision information determined as described herein to determine likelihood and/or range of potential injuries, and so forth.

As described above, certain information is used to perform a UDA algorithm in accordance with an embodiment. Example information used is shown below in Table 1. As shown, year, make, and model are obtained for both vehicles, and certain parameters regarding the vehicles can be obtained using this information. For example, mass information may be obtained and used (as described above) because collision severity is directly proportional to the mass ratios of the vehicles involved. The primary point of impact (front, rear, side) also may be obtained for both vehicles. The vehicle stiffness characteristics are based on the vehicle model and the primary point of impact. To calculate the principal direction of force (PDOF), the pre-impact motion for both vehicles may be obtained (moving forward/backward or stopped). For the vehicle with known damage, a reasonable estimate of crush or contact damage is used (which may be obtained as described above). For the vehicle with unknown damage, simply an approximate area of damage is obtained. This approximate area may be inferred from the accident description and/or sketches on a police report.

TABLE 1

| Data | Known Damage, Vehicle #1 | Unknown Damage, Vehicle #2 |
|---|---|---|
| Vehicle identification | VIN or year/make/model | |
| Primary point of impact | (front, rear, side) | |
| Pre-impact motion | Moving forward, moving backward, or stopped | |
| Collision deformation | Contact or Crush | Approximate area of damage |

Figure 4:
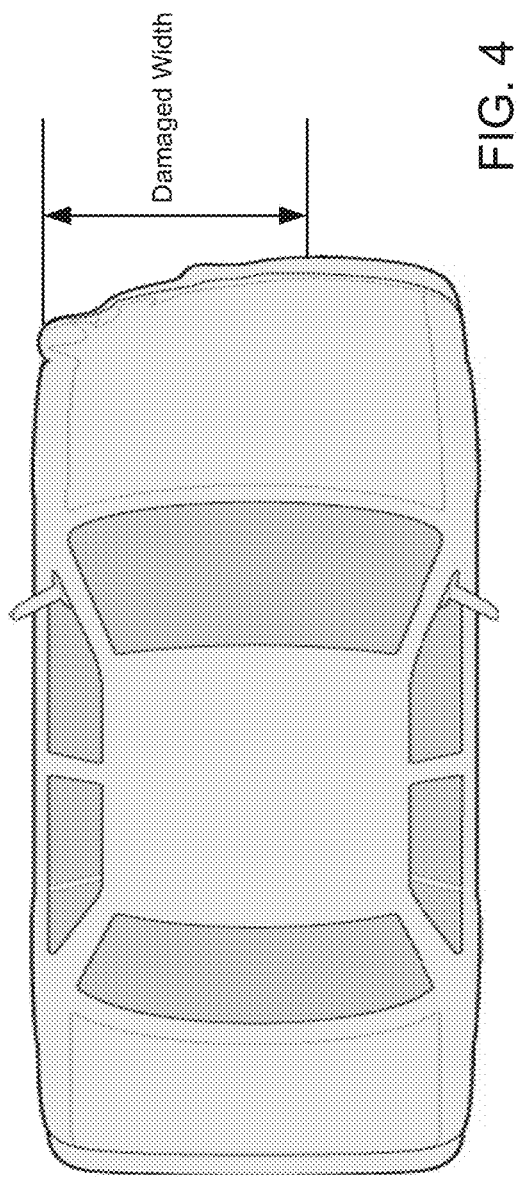
FIG. 4 is an illustration of example damage width of a vehicle in accordance with an embodiment of the present invention.

The UDA algorithm makes the following assumptions: bumpers are aligned in front-front, front-rear, and rear-rear type collisions; the damage width for the unknown damage vehicle matches the damage width of the vehicle with known damage (note also that the damage width is the extent of crush or contact damage as measured parallel with the ground and perpendicular to the primary point of impact (as seen in FIG. 4); and uniform crush profile for unknown damage vehicle.

To account for uncertainties in the variables used in the UDA algorithm, in some embodiments a Monte Carlo simulation is performed. In the Monte Carlo simulation, the steps of the UDA algorithm are conducted a predetermined number of times (e.g., between approximately 10,000 and 50,000 runs, which may be user controlled). For each of these individual runs of the UDA process, each input variable is randomly sampled within a range of its nominal value. This results in a distribution of $\Delta V$ values for both vehicles, which may be stored in a given non-transitory storage and further output to an end user entity, such as via display of a report on one or more displays of a given computer system.

Figure 5:
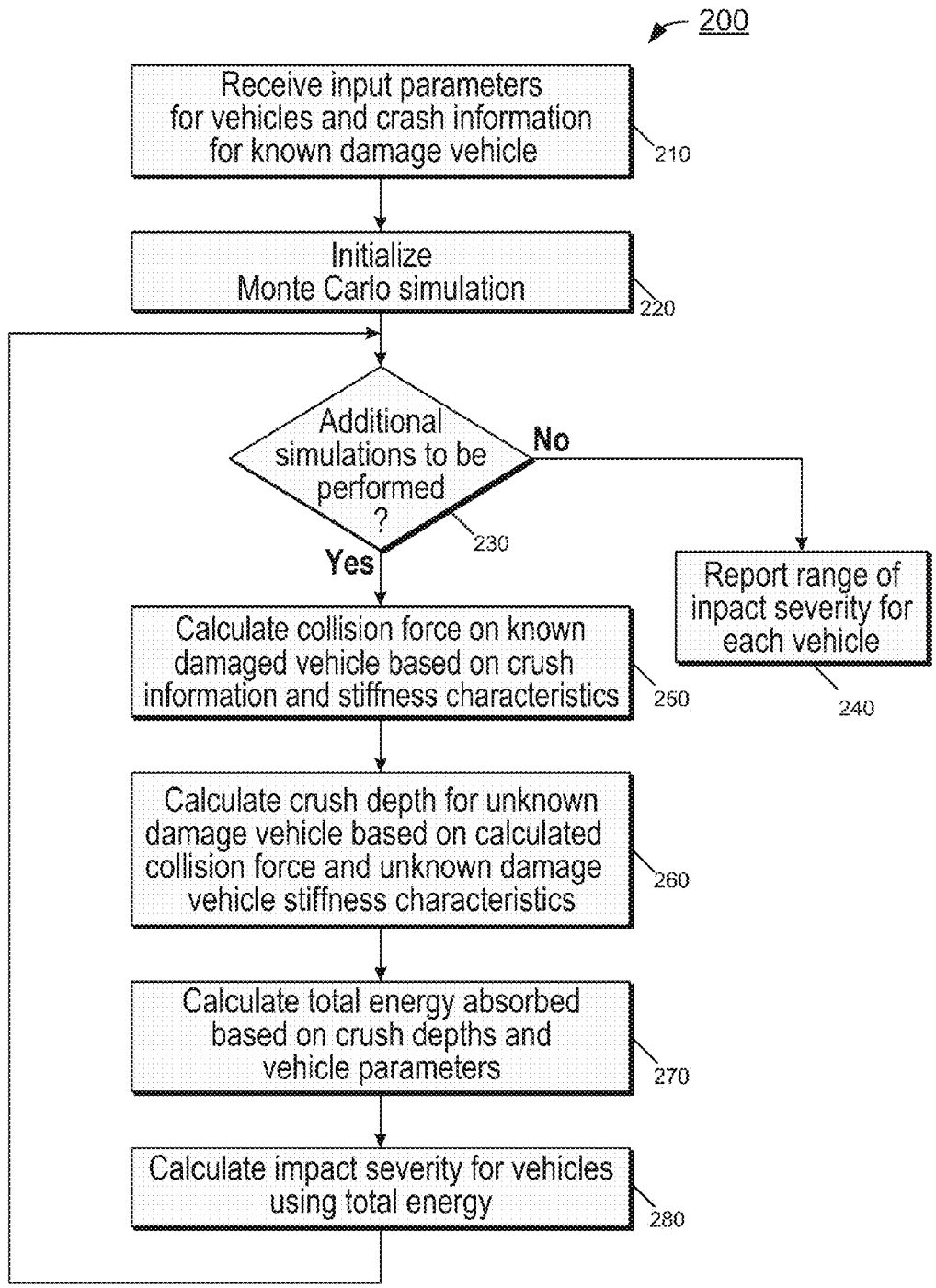
FIG. 5 is a flow diagram of a method for determining impact severity in accordance with another embodiment of the present invention.

Referring now to FIG. 5, shown is a flow diagram of a method for determining impact severity in accordance with another embodiment of the present invention. As with FIG. 3, method 200 of FIG. 5 may be performed by a combination of hardware, software and/or firmware, such as impact severity determination logic of a system. As seen, method 200 begins by receiving input parameters for the multiple vehicles in the collision and crash information for the known damage vehicle (block 210). Thereafter, control passes to block 220 where a Monte Carlo simulation may be initialized. For example, a Monte Carlo simulation module of the logic can be initialized for a given number of runs. Although the scope of the present invention is not limited in this regard, in an embodiment between approximately 10,000 and 50,000 runs may be performed in a Monte Carlo simulation for a given accident. Other initialization operations such as setting initial values for the input parameters for the first run also may be performed.

Still with reference to FIG. 5, control next passes to diamond 230 to determine whether additional simulations are to be performed. For example, a count may be maintained and incremented per each iteration of a Monte Carlo simulation. If no further simulations are to be performed, control passes to block 240 where a range of impact severity for each vehicle involved in the collision may be reported. For example, a report may be generated. This report may be stored in a report file in a non-transitory storage medium of the system. In an embodiment, the report may include both range information and details of the adjusted parameters and calculated values for the given run. Furthermore, in some cases the report may be output, e.g., via a display of the system to an end user, or via communication to an end user location, such as via a given communication network, for display to the user, and/or to enable the user to manipulate the information in the report for further analysis such as a biomechanical analysis of occupants of one or more of the vehicles.

If additional simulations are determined to be performed, control passes to block 250 where a collision force may be calculated on the known damage vehicle based on crush information and stiffness characteristics of the vehicle. Thereafter, control passes to block 260, where a crush depth may be calculated for the unknown damage vehicle based on the calculated collision force for the known damage vehicle and information of the unknown damage vehicle (including stiffness characteristics of the vehicle).

Referring still to FIG. 5, control next passes to block 270 where a total energy absorbed by the vehicles may be calculated based on the crush depths (as provided for the known damage vehicle and as calculated for the unknown damage vehicle). The total energy absorbed may further be calculated based on various vehicle parameters. Finally, at block 280 an impact severity may be calculated for the vehicles using the total energy. This impact severity value, along with the other determined values within the Monte Carlo simulation may be stored in a table in which each run of the Monte Carlo simulation has a given entry to store the various determined values (and further including the varied input parameters for the given Monte Carlo simulation run). Control next passes to diamond 230, discussed above (and where one or more of the input parameters may be updated for the next run of the Monte Carlo simulation). Thus in this way, if additional Monte Carlo simulations are to be performed, various parameters may be changed accordingly to enable a final result to be based on a distribution of determined values. Understand while shown at this high level in the embodiment of FIG. 5, many variations and alternatives are possible.

Figure 6:
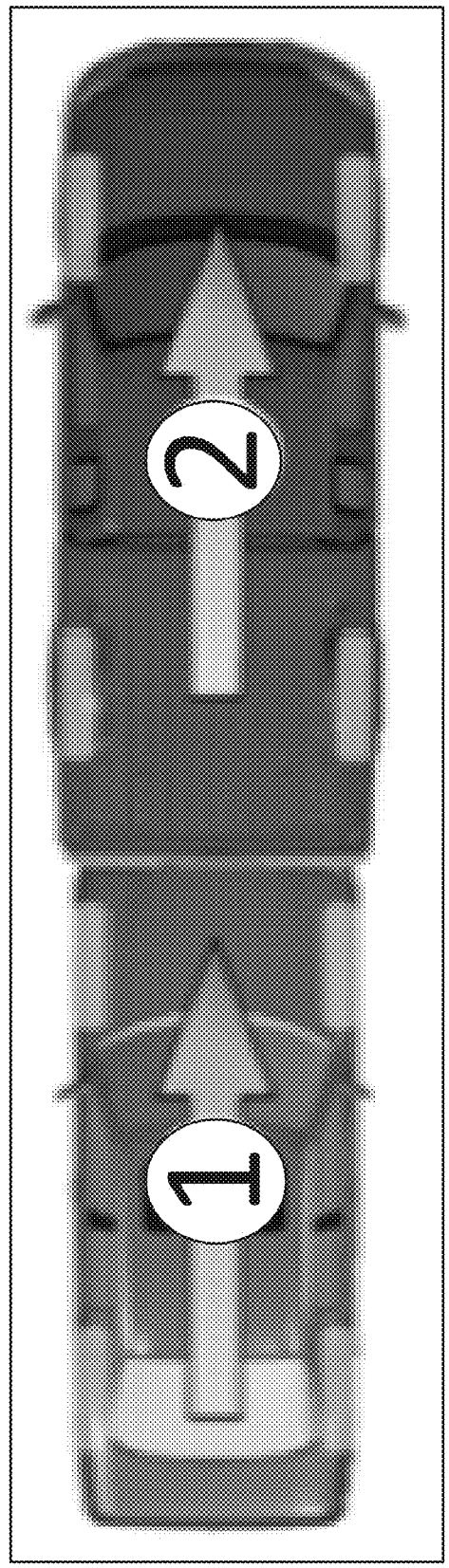
FIG. 6 is an illustration of an accident configuration for a representative collision.

The following example demonstrates how a UDA algorithm in accordance with an embodiment can be applied to a typical accident scenario. Assume a 1997 Mercedes C230 sedan rear ends a 2000 Ford F150 pickup. The Mercedes vehicle is owned by an insured party, and herein is the first party vehicle. There is a repair estimate and photographs of the Mercedes. The Ford vehicle is a third party vehicle and there are no post-accident photographs. Information regarding both vehicles (year, make and model) is entered into a computer system including impact severity determination logic as described herein, via a user input device. Assume that the primary point of impact for the Mercedes is "front" and the primary point of impact for the Ford is "rear". The police report suggests that this is an inline rear end collision with no offset (as shown in FIG. 6). In other words, both vehicles are heading in the same direction and the centerline of the Mercedes is more or less aligned with the centerline of the Ford. Both vehicles are moving forward at the time of the accident.

The post-impact photographs of the Mercedes suggest a crush pattern of 1-3 inches across the front end. The police report suggests that some damage extends across the full width of the rear end of the Ford. The user enters the crush profile for the Mercedes and indicates the approximate damage area for the Ford.

Figure 7:
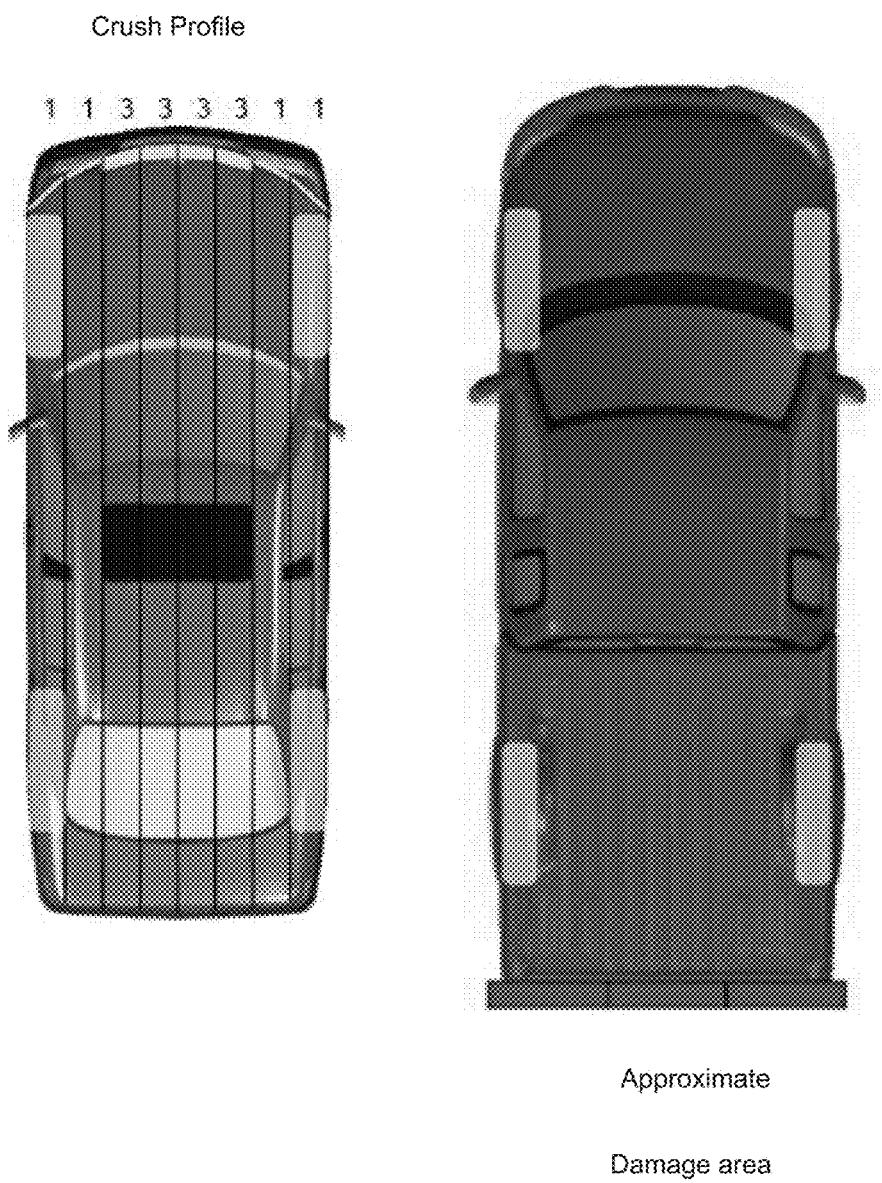
FIG. 7 is an illustration of an entry of damage information for vehicles involved in a representative collision.

FIG. 7 shows an illustration of a user entry of the known crush for the Mercedes via a crush profile selection tool, which enables an end user to control an amount of crush depth for the individual crush zones, e.g., by entry of crush depth (e.g., in inches), movement of a slider that graphically displays the crush or so forth. Similarly, the user can tag the approximate damage area of the Ford via user input.

When the user runs the analysis, the UDA algorithm calculates the collision force on the Mercedes, given its stiffness characteristics and the crush profile. Using this force value and the stiffness characteristics of the Ford, the algorithm then calculates the crush depth to the Ford required to satisfy Newton's third law. Finally, the algorithm calculates the total energy absorbed in the collision, and the collision severity for each vehicle. This collision severity, which may be part of a report provided to a user, may be used as the basis for a biomechanical analysis for occupants of one or both of the vehicles.

Figure 8:
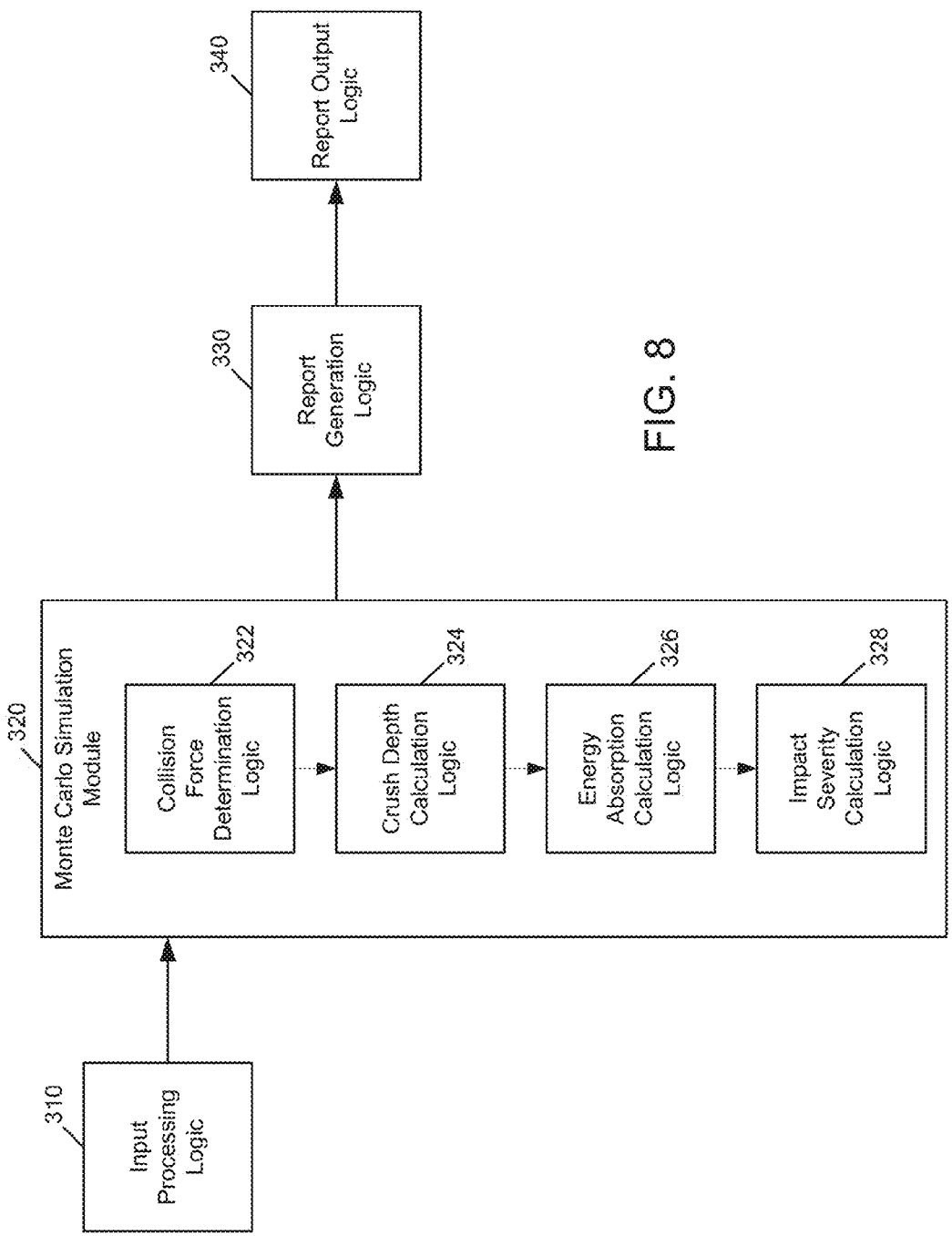
FIG. 8 is a block diagram of an impact severity determination logic in accordance with an embodiment of the present invention

Referring now to FIG. 8, shown is a block diagram of an impact severity determination logic in accordance with an embodiment of the present invention. As shown in FIG. 8, logic 300 may be, in one embodiment, specialized hardware of a computer system configured to perform the various operations described herein to enable a UDA to occur for a collision involving at least one vehicle having unknown information. In other cases, logic 300 may be implemented at least in part by various other hardware components of a system, including user input and output devices, one or more processors and/or specialized function units.

Impact severity determination logic 300 includes an input processing logic 310. In various embodiments, input processing logic 310 is configured to receive user input of information regarding a collision, including the various information available for the known damage vehicle and the unknown damage vehicle. Still further, input processing logic 310 may manipulate and process this information into an appropriate format for use in a Monte Carlo simulation module 320. In the embodiment shown, Monte Carlo simulation module 320, which in embodiments may be implemented as one or more processors, microcontrollers, signal processors, or so forth configured to execute instructions stored in a non-volatile storage medium, includes various logics. Specifically, Monte Carlo simulation module 320 includes a collision force determination logic 322, a crush depth calculation logic 324, an energy absorption calculation logic 326, and an impact severity calculation logic 328. These various constituent logics of Monte Carlo simulation module 320 may be configured to perform a UDA, as described above, e.g., with regard to FIGS. 3 and 5.

Upon completion of a Monte Carlo simulation, the simulation results, which may include various calculated values, including collision force, crush depth, energy absorption, and impact severity, may be provided to a report generation logic 330. Report generation logic 330 may be configured to generate a report. In an embodiment, the report may include various entries each associated with a given run of the Monte Carlo simulation. Thereafter, report generation logic 330 provides the generated report to a report output logic 340. In various embodiments, report output logic 340 may be configured to store the report in a non-transitory storage, such as a mass storage device of a system, e.g., a server system of an insurance company or other end user entity. Still further, report output logic 340 may be further configured to provide the report in a human-readable format for display on an output device, such as a display of the system. Understand while shown at this high level in the embodiment of FIG. 8, many variations and alternatives are possible.

Figure 9:
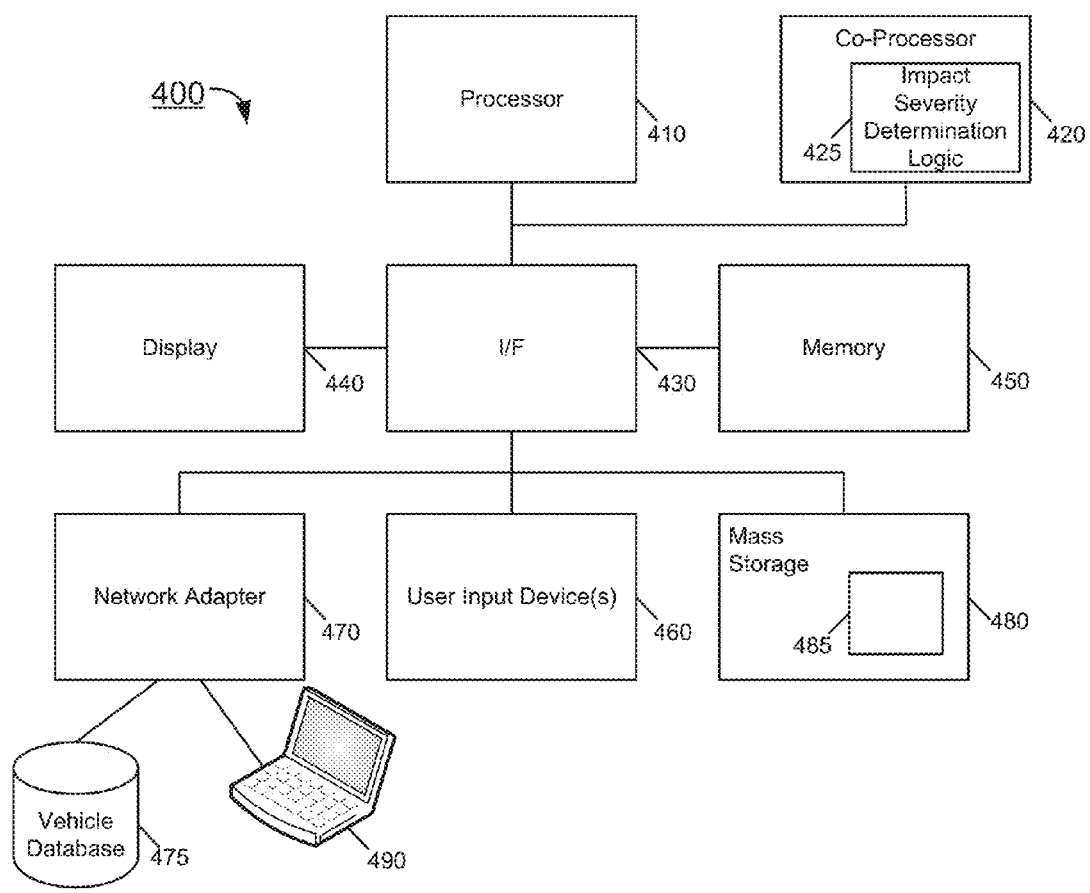
FIG. 9 is a block diagram of a system in accordance with one embodiment of the present invention.

Referring now to FIG. 9, shown is a block diagram of a system in accordance with one embodiment of the present invention. As shown in FIG. 9, system 400 may be a computer system, such as a personal computer, server computer or other such system. System 400 may include a processor 410, which may be a microprocessor such as a central processing unit. A coprocessor 420 is coupled to processor 410. In an embodiment, coprocessor 420 may be a similar or different type of microprocessor as processor 410, such as a given multicore or other type of processor. In the embodiment shown, coprocessor 420 includes an impact severity determination logic 425, which may be configured as discussed above with regard to logic 300 of FIG. 8. As such, in at least some embodiments logic 425 may be specially configured hardware to perform the impact severity determinations described herein. Processor 410 and coprocessor 420 are coupled via an interface 430 that in turn is coupled to a memory 450 and a display 440, which may be a flat panel display, for example. During operation, memory 450 may store software in accordance with an embodiment of the present invention that includes instructions to perform the various techniques described herein.

As further shown in FIG. 9, interface 430 is coupled to various components, including one or more user input devices 460, a network adapter 470, and a mass storage 480. Network adapter 470 may be used to communicate between system 400 and one or more other computers via a computer network, such as a local area network (LAN), a wide area network (WAN), or a wireless network, such as a wireless LAN (WLAN). In the embodiment shown, as examples, network adapter 470 may couple to a vehicle database 475, which may be a database that stores various parameters of many different types of vehicle makes and models, so that these parameters can be accessed and used as described herein, responsive to input of a particular vehicle make and model for a vehicle involved in a collision. As further shown, network adapter 470 may further couple to another computer system 490, to which results of a report generated as described herein may be provided. Furthermore, network adapter 470 may communicate with other remote systems, such as computers of an insurance company or other third party that desires to send vehicle and accident information to system 400 for analysis in accordance with an embodiment of the present invention. Such communication may be via the Internet or another such computer network. In some implementations, these communications may be made secure, e.g., via encryption or in another secure format.

Still with reference to FIG. 9, interface 430 further couples to mass storage 480, which in an embodiment may be implemented as one or more disk drives, optical storage, flash memory or other non-volatile storage. In the embodiment shown, mass storage 480 includes an application program 485 which, in an embodiment may include instructions, data and/or other code to perform some or all of the impact severity determination processes described herein, when incomplete information is available for one or more vehicles involved in a collision. Understand while shown with this particular implementation of a computer system, many variations and alternatives are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving, in an impact severity determination hardware logic of a computer system, first information for a first vehicle involved in a collision and second information for a second vehicle involved in the collision, wherein the first information includes first crush depth information for the first vehicle regarding a deformation of the first vehicle, the first crush depth information obtained via the computer system, and further wherein crush depth information is not available for the second vehicle;

initializing, in the impact severity determination hardware logic, a Monte Carlo simulation;

calculating, in the impact severity determination hardware logic, for each of a plurality of iterations of the Monte Carlo simulation, a collision force on the first vehicle based at least in part on the first information;

calculating, in the impact severity determination hardware logic, for each of the plurality of iterations of the Monte Carlo simulation, a crush depth for the second vehicle based at least in part on the calculated collision force on the first vehicle and the second information;

calculating, in the impact severity determination hardware logic, for each of the plurality of iterations of the Monte Carlo simulation, first total energy absorbed by the first vehicle based on the first information including the first crush depth information for the first vehicle, and calculating second total energy absorbed by the second vehicle based on the calculated crush depth and the second information;

calculating, in the impact severity determination hardware logic, for each of the plurality of iterations of the Monte Carlo simulation, a first impact severity for the first vehicle using the first total energy, and calculating a second impact severity for the second vehicle using the second total energy; and reporting a range of the first impact severity for the first vehicle and a range of the second impact severity for the second vehicle based on the Monte Carlo simulation, via an output device of the computer system.

2. The method of claim 1, wherein calculating the collision force on the first vehicle comprises determining an average crush depth of the first vehicle for a plurality of crush zones of the first vehicle, and calculating the collision force using the average crush depth.

3. The method of claim 1, wherein calculating the second total energy absorbed by the second vehicle comprises determining a threshold force corresponding to a maximum amount of force to be applied to the second vehicle without causing permanent deformation, and using the threshold force to calculate the second total energy absorbed by the second vehicle.

4. The method of claim 1, further comprising calculating the first total energy absorbed by the first vehicle using a first equation, and calculating the second total energy absorbed by the second vehicle using a second equation, the first equation different than the second equation.

5. The method of claim 1, further comprising, for each of the plurality of iterations of the Monte Carlo simulation, updating one or more of the first information and one or more of the second information.

6. The method of claim 1, further comprising reporting a result of the Monte Carlo simulation to an end user via a display of the computer system.

7. The method of claim 1, further comprising communicating a result of the Monte Carlo simulation from the computer system to a second computer system, to enable an end user to view the result via a display of the second system.

8. A system comprising:
an input processing hardware logic to receive first information regarding a first vehicle involved in a collision and to receive second information regarding a second vehicle involved in the collision, the first information including first crush depth information for the first vehicle regarding a deformation of the first vehicle, the first crush depth information obtained via the system, the second information not including crush depth information for the second vehicle;

a Monte Carlo simulation module comprising:
  a collision force determination hardware logic to calculate a collision force on the first vehicle based at least in part on the first information;
  a crush depth calculation hardware logic to calculate a crush depth for the second vehicle based at least in part on the calculated collision force on the first vehicle and the second information;
  an energy absorption calculation hardware logic to calculate first total energy absorbed by the first vehicle based on the first information including the first crush depth information for the first vehicle, and to calculate second total energy absorbed by the second vehicle based on the calculated crush depth and the second information; and
  an impact severity calculation hardware logic to calculate a first estimated impact severity for the first vehicle using the first total energy and a second estimated impact severity for the second vehicle using the second total energy;
  a report generation hardware logic to generate a report including the first estimated impact severity for the first vehicle and the second estimated impact severity for the second vehicle, for each of a plurality of iterations of a Monte Carlo simulation; and
  a report output hardware logic coupled to the report generation hardware logic to output the report to an end user.

9. The system of claim 8, wherein the collision force determination hardware logic is to determine an average crush depth of the first vehicle for a plurality of crush zones of the first vehicle, and calculate the collision force using the average crush depth.

10. The system of claim 8, wherein the energy absorption calculation hardware logic is to determine a threshold force corresponding to a maximum amount of force to be applied to the second vehicle without causing permanent deformation, and use the threshold force to calculate the second total energy absorbed by the second vehicle.

11. The system of claim 8, wherein the energy absorption calculation hardware logic is to calculate the first total energy absorbed by the first vehicle using a first equation, and calculate the second total energy absorbed by the second vehicle using a second equation, the first equation different than the second equation.

12. The system of claim 8, wherein the Monte Carlo simulation hardware module is, for each of the plurality of iterations of the Monte Carlo simulation, to update one or more of the first information and one or more of the second information.

13. The system of claim 12, wherein responsive to the update to the one or more of the first information and the one or more of the second information, the first estimated impact severity for the first vehicle and the second estimated impact severity for the second vehicle are to be different for each of the plurality of iterations of the Monte Carlo simulation.

14. The system of claim 13, wherein the report generation hardware logic is to include in the report a range for the first estimated impact severity for the first vehicle and a range for the second estimated impact severity for the second vehicle.

15. The system of claim 8, wherein the report output hardware logic is to output the report via a display of the system.

16. The system of claim 8, wherein the report output hardware logic is to output the report via communication to a second system coupled to the system.

17. A non-transitory computer readable medium comprising instructions that when executed enable a computer system to perform a method comprising:
- receiving first information for a first vehicle involved in a collision and second information for a second vehicle involved in the collision, wherein the first information includes first crush depth information for the first vehicle regarding a deformation of the first vehicle, the first crush depth information obtained via the computer system, crush depth information is not available for the second vehicle;
- initializing a Monte Carlo simulation;
- calculating, for each of a plurality of iterations of the Monte Carlo simulation, a collision force on the first vehicle based at least in part on the first information;
- calculating, for each of the plurality of iterations of the Monte Carlo simulation, a crush depth for the second vehicle based at least in part on the calculated collision force on the first vehicle and the second information;
- calculating, for each of the plurality of iterations of the Monte Carlo simulation, first total energy absorbed by the first vehicle based on the first information including the first crush information for the first vehicle, and calculating second total energy absorbed by the second vehicle based on the calculated crush depth and the second information;
- calculating, for each of the plurality of iterations of the Monte Carlo simulation, a first impact severity for the first vehicle using the first total energy, and calculating a second impact severity for the second vehicle using the second total energy; and
- reporting a range of the first impact severity for the first vehicle and a range of the second impact severity for the second vehicle based on the Monte Carlo simulation, via an output device of the computer system.

18. The non-transitory computer readable medium of claim 17, further comprising instructions to enable the computer system to determine an average crush depth of the first vehicle for a plurality of crush zones of the first vehicle, and calculate the collision force using the average crush depth.

19. The non-transitory computer readable medium of claim 17, further comprising instructions to enable the computer system to determine a threshold force corresponding to a maximum amount of force to be applied to the second vehicle without causing permanent deformation, and use the threshold force to calculate the second total energy absorbed.

20. The non-transitory computer readable medium of claim 17, further comprising instructions to enable the computer system to, for each of the plurality of iterations of the Monte Carlo simulation, update one or more of the first information and one or more of the second information.

* * * * *